UNITED STATES PATENT OFFICE.

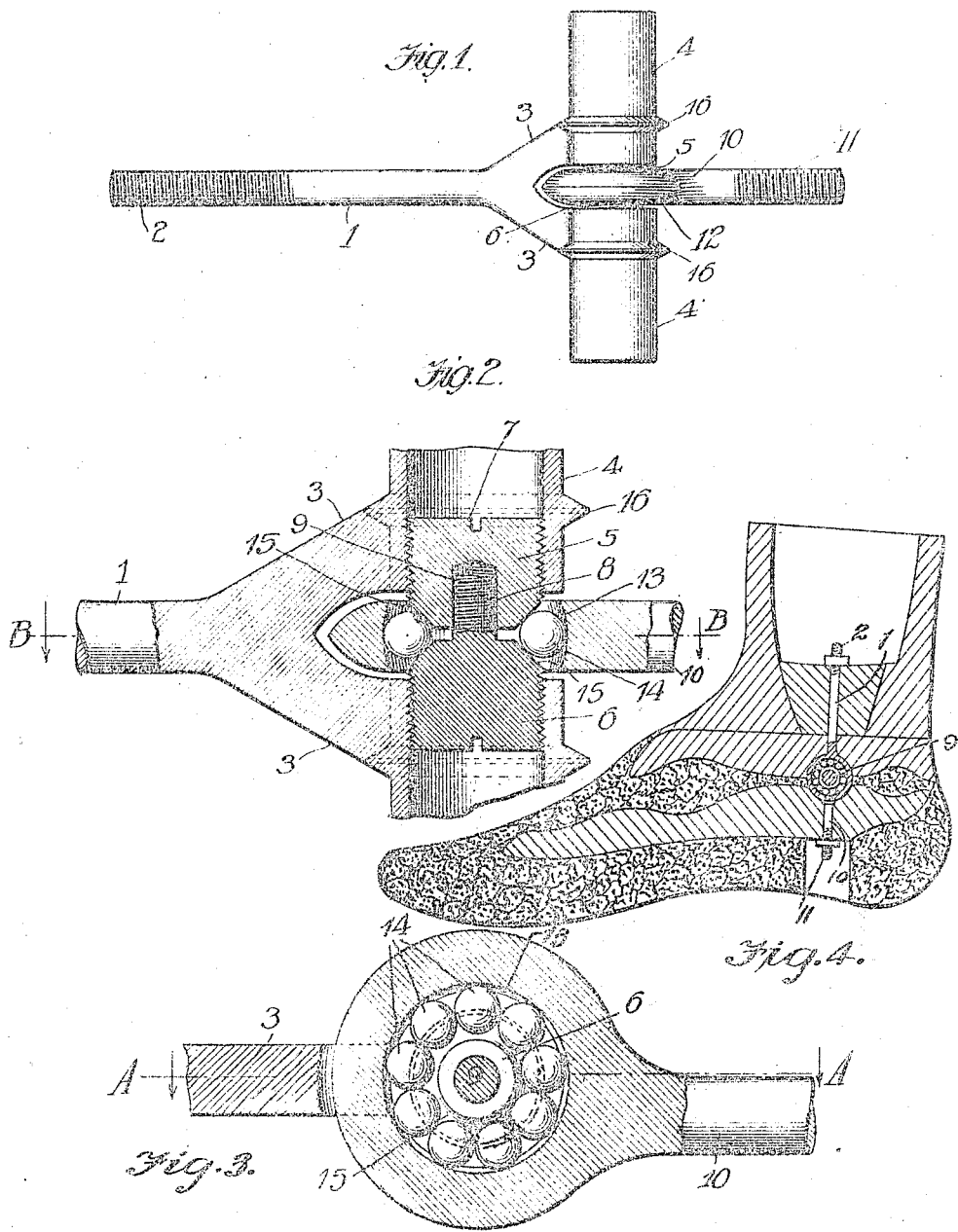

JAMES F. ROWLEY, OF CHICAGO, ILLINOIS.

ANKLE-JOINT FOR ARTIFICIAL LIMBS.

1,123,928.  Specification of Letters Patent.  Patented Jan. 5, 1915.

Application filed October 13, 1913. Serial No. 794,875.

*To all whom it may concern:*

Be it known that I, JAMES F. ROWLEY, a citizen of the United States of America, and a resident of Chicago, county of Cook, and State of Illinois, have invented certain new and useful Improvements in Ankle-Joints for Artificial Limbs, of which the following is a specification.

The main object of this invention is to provide an ankle joint bearing having rolling contact with its elements for the purpose of being practically silent in operation even if not lubricated, and which is adjustable to maintain any desired pressure between the coöperating parts of the bearing.

An illustrative embodiment of this invention is shown in the accompanying drawings, in which—

Figure 1 is a plan view of an ankle joint constructed according to this invention. Fig. 2 is a sectional view of the ankle joint taken on the line A—A of Fig. 3. Fig. 3 is a sectional view of the ankle joint taken on the line B—B of Fig. 2. Fig. 4 is a vertical section showing the joint as applied to an artificial limb.

The part of the ankle joint which is secured to the shin section of an artificial limb is shown in the form of a shank 1 threaded at its end 2 and having its other end formed to provide a pair of arms 3 terminating in hollow cylinders 4 in coaxial alinement.

The cylinders 4 are internally threaded for receiving threaded conical bearing members 5 and 6. Each of the bearing members 5 and 6 is provided with a slot 7, so that by inserting a screw driver into the open ends of cylinders 4 said members may be adjusted toward or away from each other. The bearing member 5 is provided with a threaded aperture 8 for receiving a threaded stud 9 integral with the bearing member 6.

A shank 10 having a threaded end 11, whereby it may be secured to the foot part of an artificial limb, is provided with a hollow head 12 surrounding the inner ends of the conical bearing members 5 and 6. The interior surface 13 of head 12 is suitably formed to provide a race for rollers in the form of balls 14 located between the surface 13 and the conical surfaces 15 of the members 5 and 6. The hollow cylinders 4 of the arms 3 are preferably provided with annular flanges 16 to facilitate securing the body part of a foot to an ankle joint. The required limitation of the relative movement between the shin and foot parts of the limb may be provided for in the foot structure proper.

The outer portions of the cylinders 4 are journals for the foot section, while the ball bearing is the connecting joint between the two sections providing a rolling contact not intended to reduce friction but to be noiseless even after the lubricant is gone.

The operation of the device is believed to be apparent. Any required pressure between the elements of the bearing member to resist relative movement between the shin and foot parts of an artificial limb, may be effected by adjusting the bearing members 5 and 6 toward each other. As there is principally a rolling contact between the various parts of the bearing member, it is not essential that the parts be kept well lubricated.

Although but one specific embodiment of this invention has been herein shown and described, it will be understood that some of the details of the construction shown may be altered or omitted without departing from the spirit of this invention as defined by the following claims.

I claim—

1. The combination in an artificial limb of a foot section, a shin section, a connection for said sections comprising a shin shank terminating in a pair of journals for the foot section, a foot shank having a head located between said journals, and rollers interposed between said head and journals.

2. The combination in an artificial limb of a foot section, a shin section, a joint interposed between said sections comprising a shin shank having a pair of arms at one end, each of said arms terminating in an integral cylinder, said cylinders having outer portions adapted to serve as journals for said foot section and each containing a bearing cone, and a foot shank having a hollow head surrounding the inner ends of said cones and rollers interposed between said cones and the hollow head of said shank.

Signed at Chicago this 10th day of October 1913.

JAMES F. ROWLEY.

Witnesses:
EUGENE A. RUMMLER,
M. IRENE HUTCHINGS.